United States Patent [19]
Rodaway

[11] Patent Number: 5,717,139
[45] Date of Patent: Feb. 10, 1998

[54] CIRCULAR SAW BLADE BALANCING TOOL

[76] Inventor: Keith S. Rodaway, P.O. Box 148, Somers, Mont. 59932

[21] Appl. No.: 725,471

[22] Filed: Oct. 4, 1996

[51] Int. Cl.$^6$ .............................. G01M 1/00; F16F 15/22
[52] U.S. Cl. ...................... 73/487; 74/573 R; 74/573 F
[58] Field of Search .......................... 73/66, 482, 483, 73/484, 487; 74/572, 573 F, 573 R

[56] References Cited

U.S. PATENT DOCUMENTS

| | | | |
|---|---|---|---|
| 2,613,532 | 10/1952 | Jones | 73/487 |
| 3,357,258 | 12/1967 | Snider | 73/487 |
| 3,357,259 | 12/1967 | Hansen | 73/487 |

*Primary Examiner*—Hezron E. Williams
*Assistant Examiner*—Richard A. Moller

*Attorney, Agent, or Firm*—Harry M. Cross, Jr.

[57] ABSTRACT

A saw blade balancing tool which comprises a balancing gauge adapted to be mounted to a saw blade hub, and a balancing stand. The balancing gauge comprises a frame, a balancing mechanism mounted to the frame, and a level indicator mounted to the frame. The balancing mechanism includes adjustable elements for balancing a saw blade and for indicating a locus for removing material from the saw blade to balance the saw blade about its hub. The said balancing stand has a saw blade mounting cap for mounting a saw blade at its hub and for positioning the balancing gauge on the saw blade. The balancing mechanism comprises a pair of sliders carried by the frame and mounted for movement in synchronism with one another, one of the sliders being adapted to receive a balancing weight and the other of the sliders being adapted to indicate the locus for removing material from the saw blade.

15 Claims, 9 Drawing Sheets

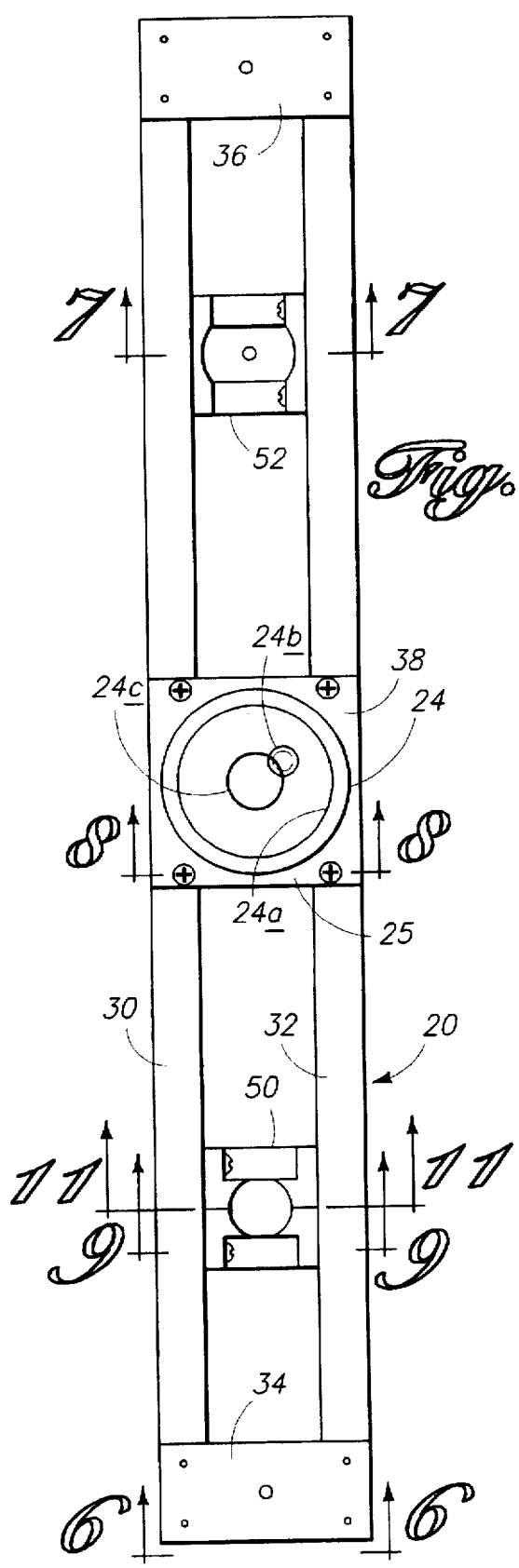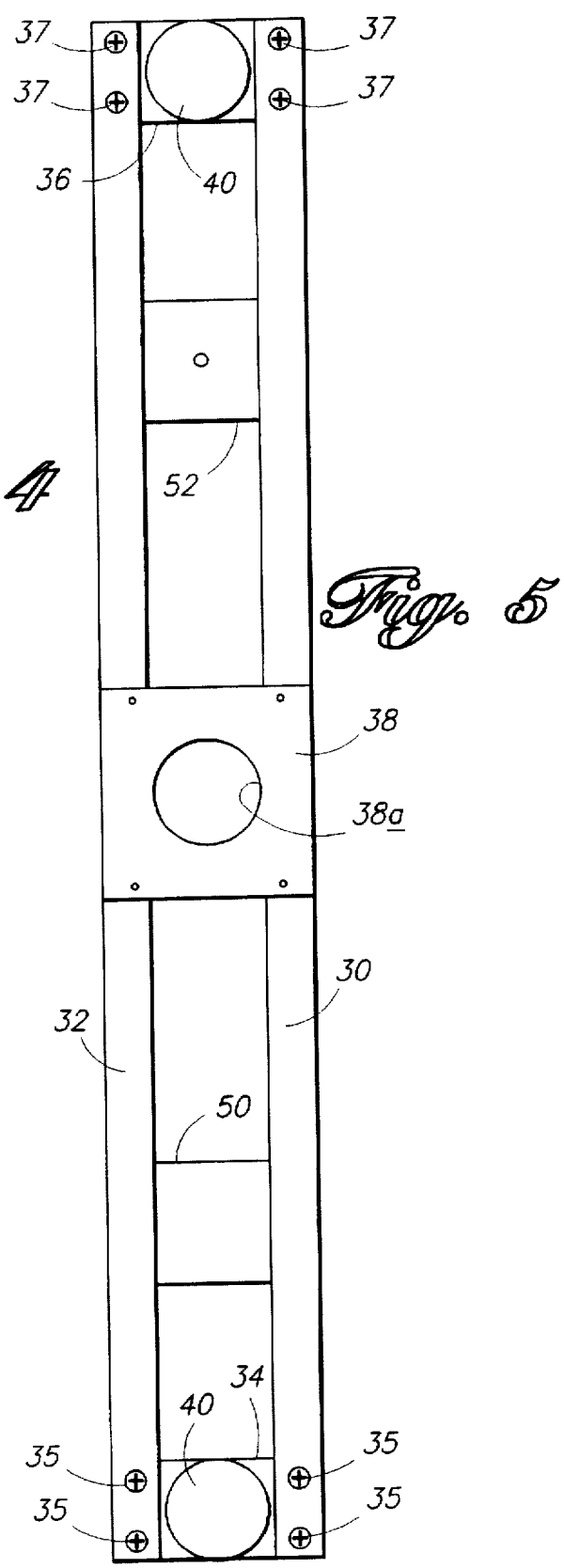

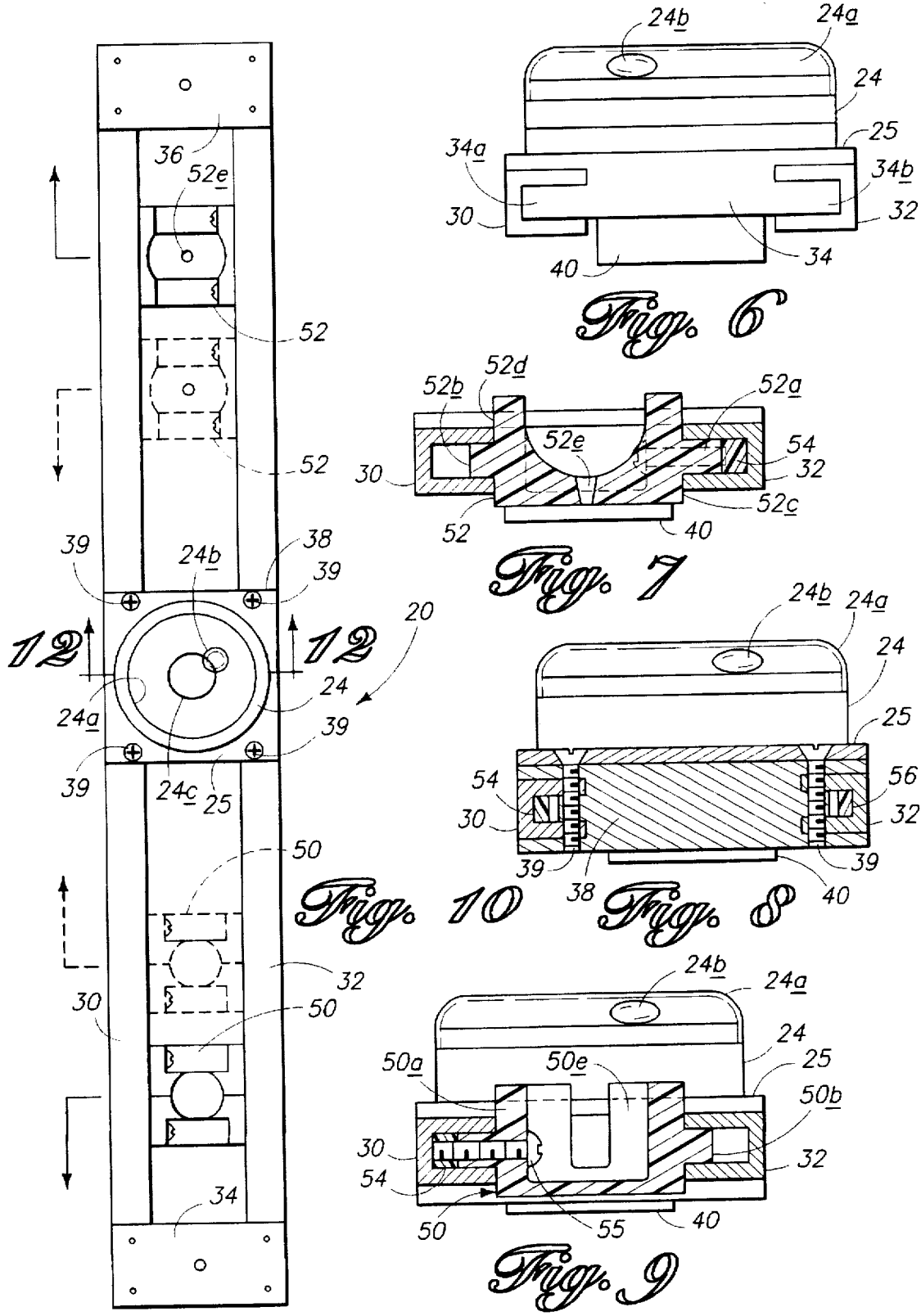

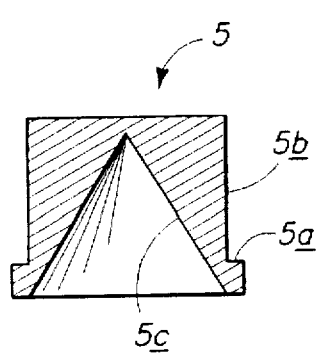
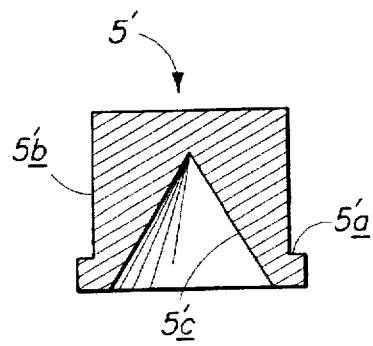
Fig. 22A        Fig. 22B
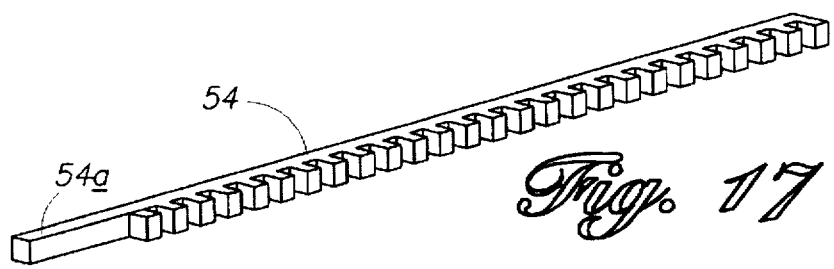
Fig. 17
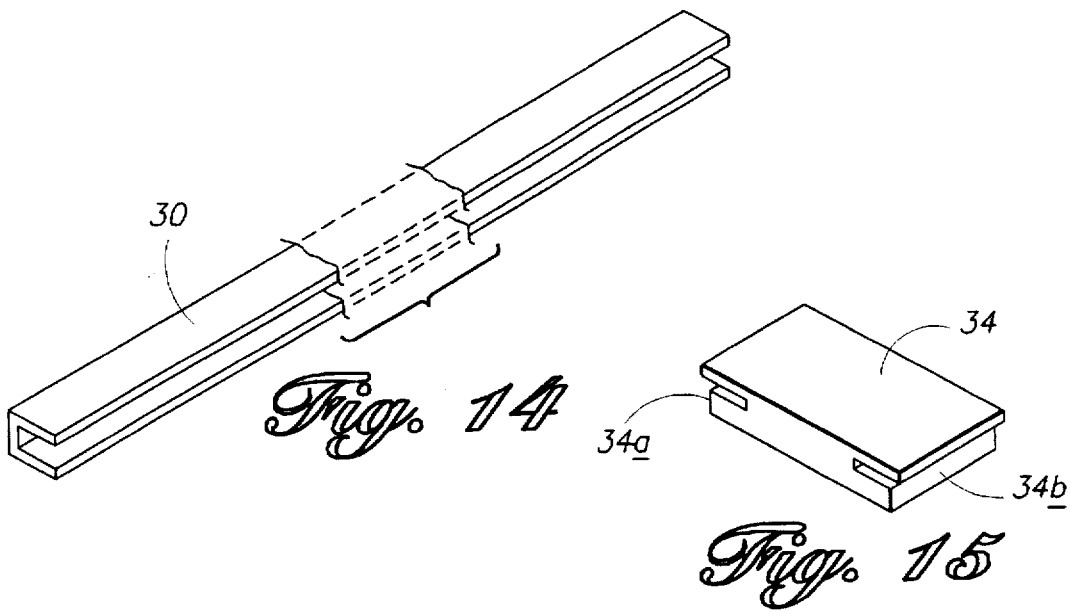
Fig. 14
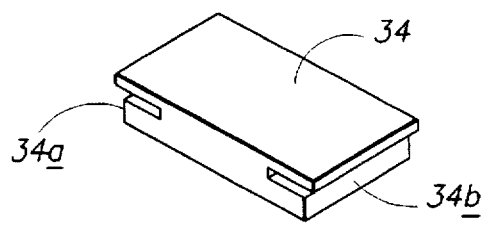
Fig. 15
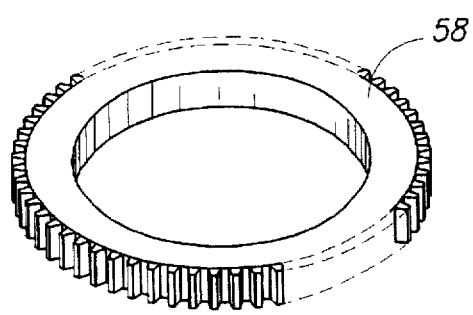
Fig. 16

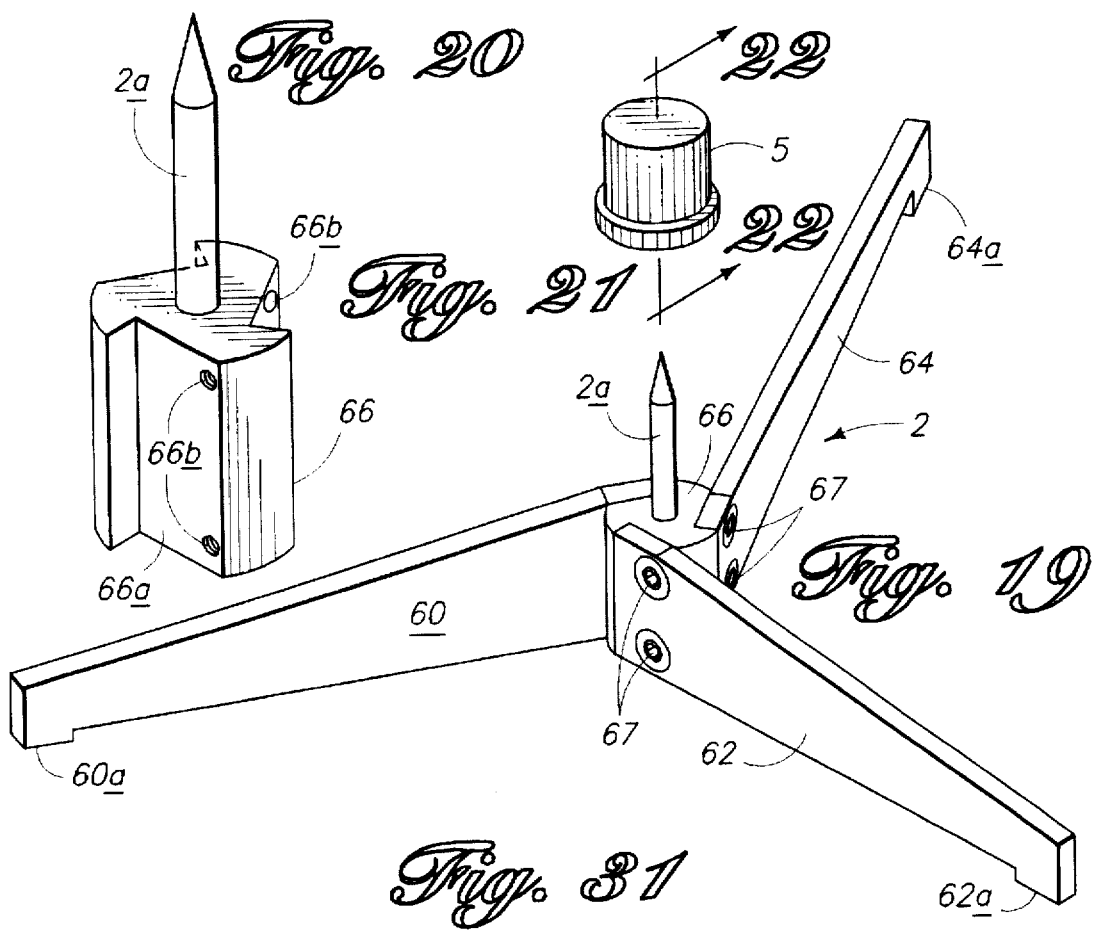
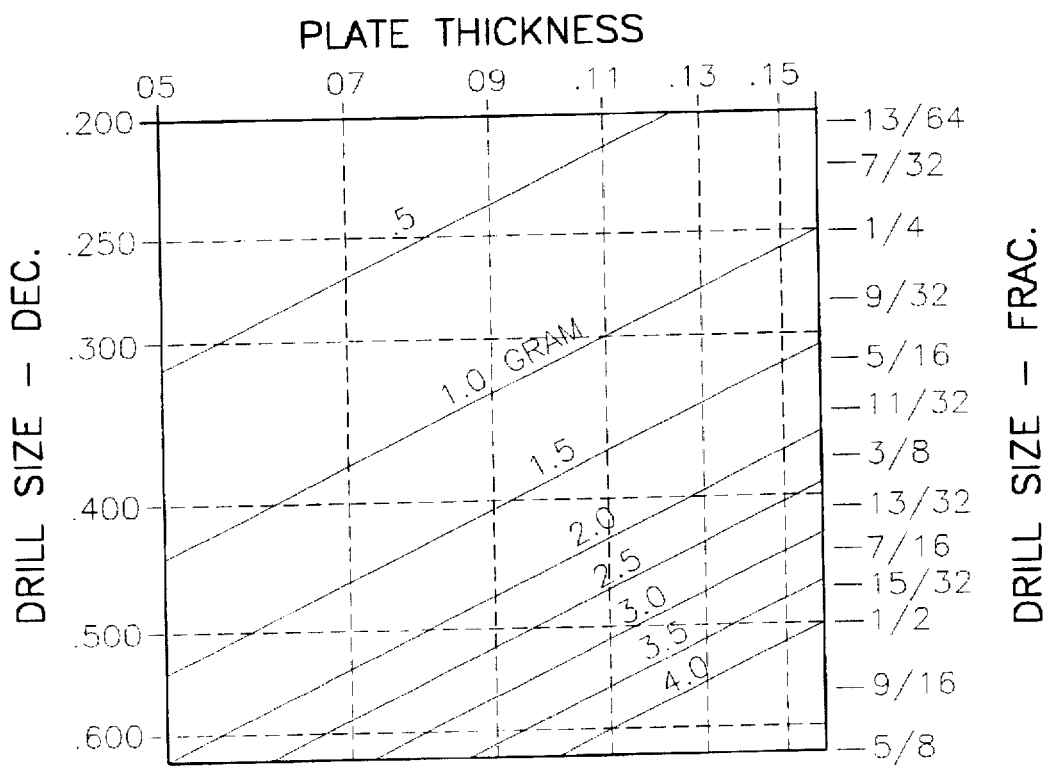

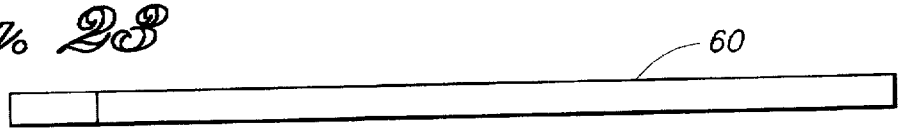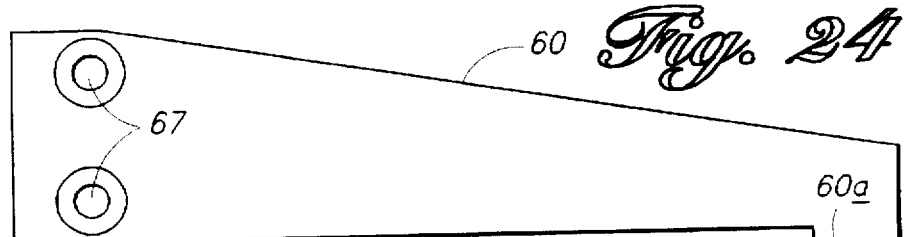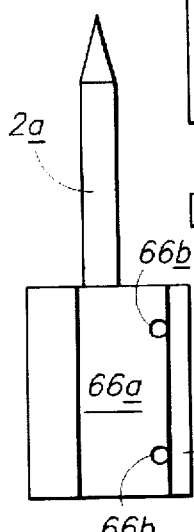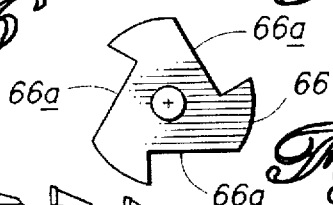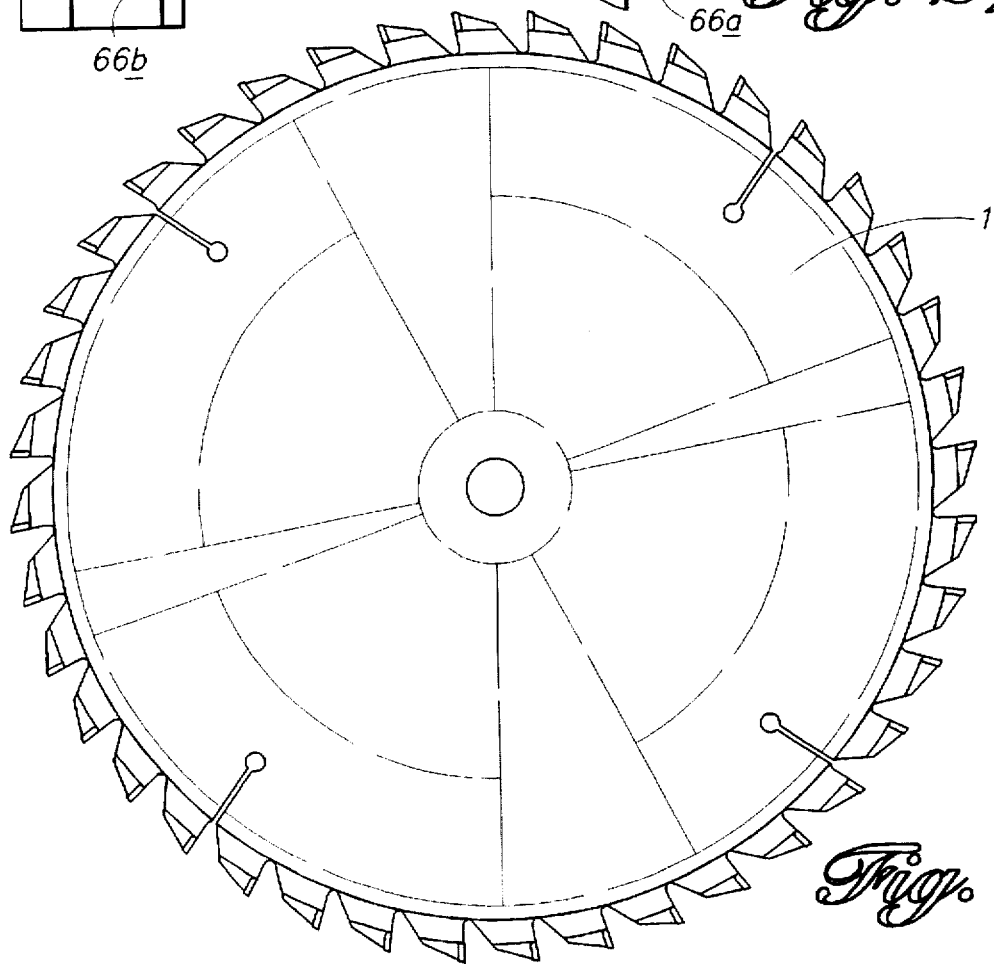

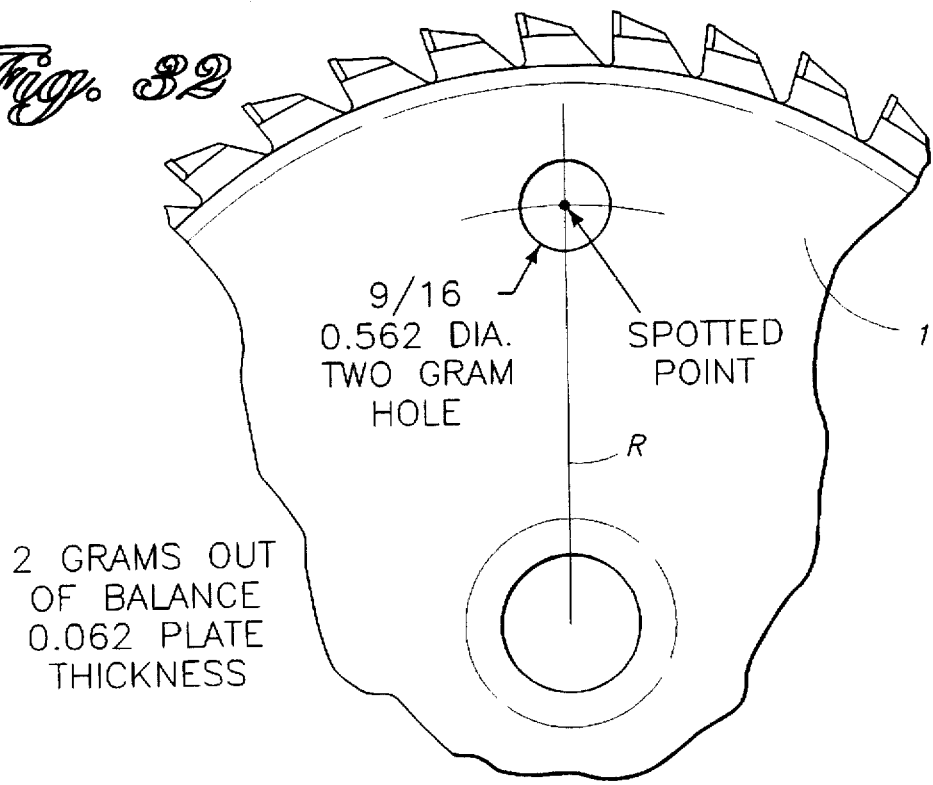
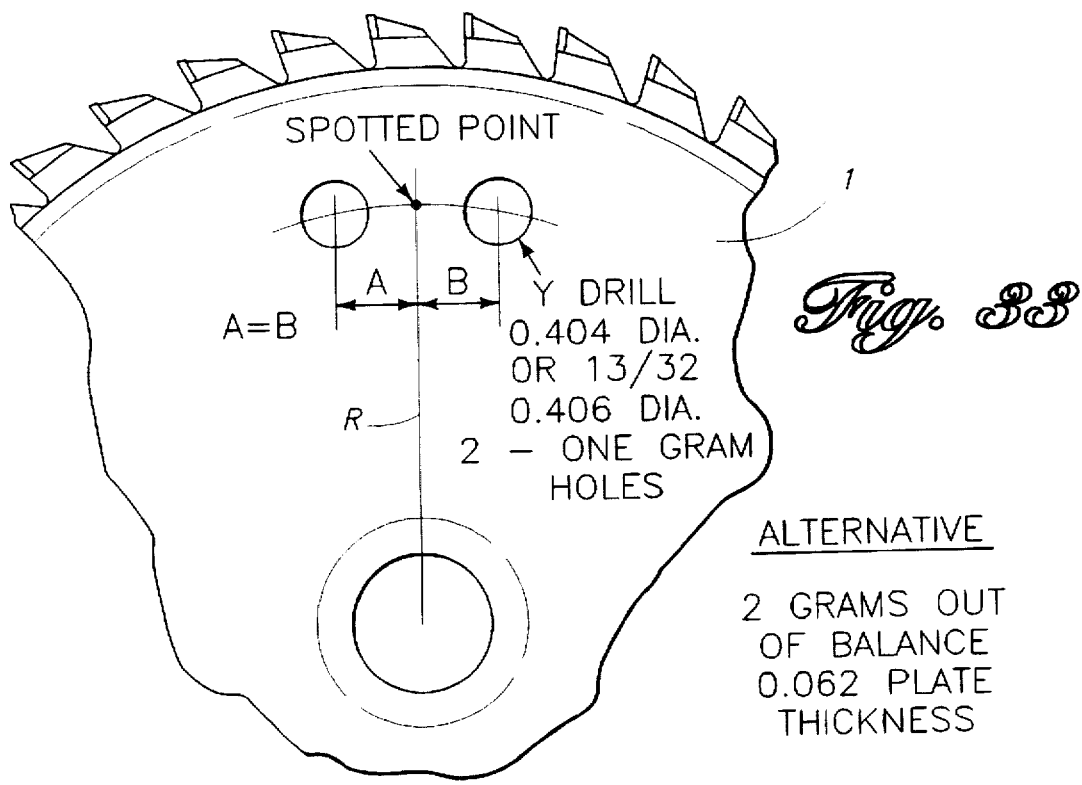

CIRCULAR SAW BLADE BALANCING TOOL

BACKGROUND OF THE INVENTION

1. Field of the Invention

This invention relates to tools for balancing saw blades and, more particularly, to tools for balancing circular saw blades.

2. Brief Description of the Prior Art

The balancing of circular saw blades is important when you consider that a 10 inch diameter blade out of balance by just one gram at a four inch radius will have a centrifugal force of 3 pounds vibrating at 57.5 times a second when turning at 3450 RPM. Even new blades sometimes are out of balance by as much as two or three grams. Sharpening can cause an out of balance condition. Moreover, since premium blades have larger carbide tips on their teeth for more re-sharpening, re-sharpened premium blades can have the worst out of balance conditions. Furthermore, carbide-tips can be broken or knocked out during use, resulting in an out of balance condition.

As a consequence of becoming unbalance, many blades are discarded or used only for rough cut work. However, if these blades could be dynamically balanced so that they were made to run straight and true without vibration, they could be salvaged.

SUMMARY OF THE INVENTION

It is a primary object of the present invention to provide a tool for balancing circular saw blades that is simple and convenient to use. Another object is to provide such a tool for use by handymen or craftsmen that can be applied to any circular saw blade size typically used by craftsmen and carpenters.

These objects and advantages will become apparent from the following description of the invention.

In accordance with these objects and advantages, the invention comprises: balancing gauge means adapted to be mounted to a saw blade hub, and balancing stand means. The balancing gauge means comprises a frame, balancing mechanism means mounted to the frame, and level indicator means mounted to the frame. The balancing mechanism means includes adjustable means for balancing a saw blade and for indicating a locus for removing material from the saw blade to balance the saw blade about its hub. The adjustable means includes a pair of sliders carried by the frame and means for moving the sliders in synchronism with one another, one of the sliders being adapted to receive a balancing weight and the other of the sliders being adapted to indicate the locus for removing material from the saw blade. The balancing stand means has means for mounting a saw blade at its hub and for positioning the balancing gauge means on the saw blade. The frame comprises a pair of side members having inwardly facing channels, a pair of end members joining the side members, and a centrally-disposed retainer member extending between the side members and mounting the level indicator means.

BRIEF DESCRIPTION OF THE DRAWINGS

FIG. 4 is a top plan view of one embodiment of the saw blade balancing gauge for the tool of this invention;

FIG. 5 is a bottom plan view of the FIG. 4 gauge;

FIG. 6 is an end view of the FIG. 4 gauge taken along the line 6—6 in FIG. 4;

FIG. 7 is a cross-section taken along the line 7—7 in FIG. 4;

FIG. 8 is a cross-section taken along the line 8—8 in FIG. 4;

FIG. 9 is a cross-section taken along the line 9—9 in FIG. 4;

FIG. 10 is a top plan view of the FIG. 4 gauge illustrating in phantom different positions of the saw balancing elements of the gauge;

FIG. 14 is an isometric view of a channel side rail of the FIG. 1 gauge;

FIG. 15 is an isometric view of an end piece of the FIG. 1 gauge;

FIG. 16 is an isometric view of a ring gear of the FIG. 1 gauge;

FIG. 17 is an isometric view of a toothed bar of the FIG. 1 gauge;

FIG. 19 is an isometric view of a balancing stand for the tool of this invention;

FIG. 20 is an isometric view of a balancing center stud of the FIG. 19 balancing stand;

FIG. 21 is an isometric view of a centering cap for fitting a circular saw blade to the FIG. 19 balancing stand;

FIGS. 22A and 22B are cross-sections through the FIG. 21 centering cap taken along the line 22—22 in FIG. 21 illustrating alternative internal configurations for the centering cap;

FIG. 23 is a top plan view of one of the legs of the FIG. 19 balancing stand;

FIG. 24 is a side elevation view of the FIG. 23 leg;

FIG. 25 is a bottom plan view of the FIG. 23 leg;

FIG. 26 is a side elevation view of the FIG. 20 balancing center stud;

FIG. 27 is a top plan view of the FIG. 20 balancing center stud;

FIG. 28 is a top plan view of a circular saw blade;

FIG. 31 is a drill size chart;

FIG. 32 is a diagrammatic view of the location of a spotted point and balancing hole on a saw blade;

FIG. 33 is a diagrammatic view of the location of a spotted point and two balancing holes on a saw blade.

DESCRIPTION OF THE PREFERRED EMBODIMENT

If a circular saw blade 1 is supported at its hub at an elevation that is slightly above its center of gravity, the blade will assume an attitude that will equalize the couples acting on the blade. In considering the dynamic balance of a saw blade, one can neglect any effect from secondary couples because the blade can essentially be considered a two dimensional disk; the width of the blade being in the order of 100 to 1 to the diameter.. Thus, since all forces are in a single plane, statically balancing this disk will also result in the primary couples being dynamically balanced.

Figure 1:
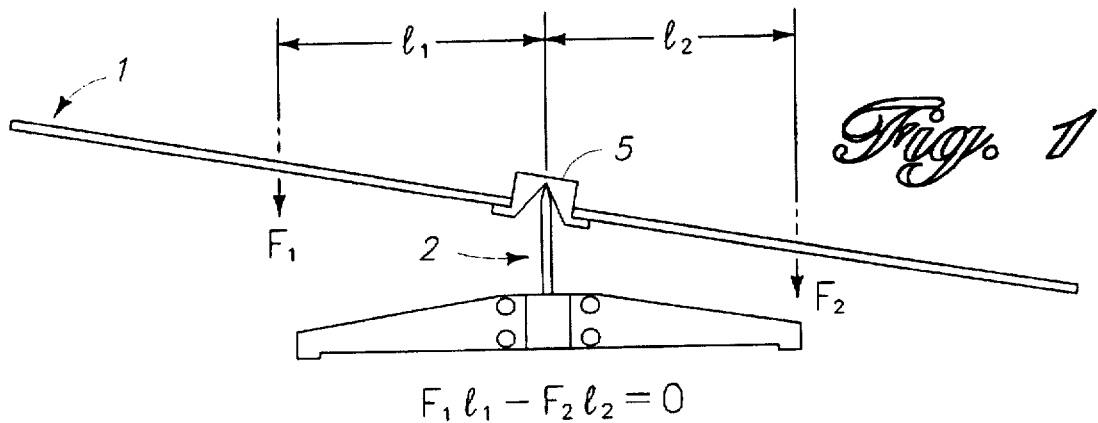
FIG. 1 is a diagrammatic side elevation of an unbalanced circular saw blade mounted at its hub to reflect its out of balance condition.

Supporting this disk at its hub at a point which is slightly above the center of gravity, as in FIG. 1, results in any out of balance condition causing a couple. This couple will cause the disk to rotate (i.e. to pivot about its hub support 2) until equilibrium is established, when all the forces are balanced. Such a condition is shown in FIG. 1.

Figure 2:
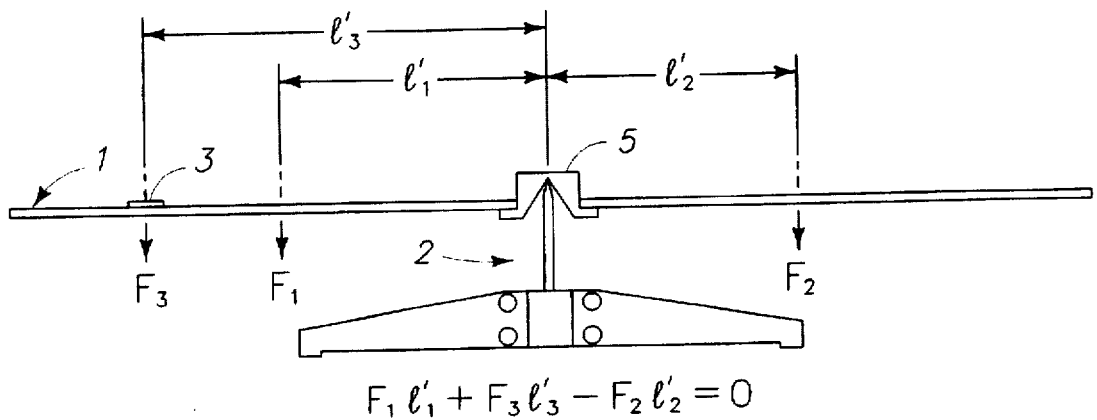
FIG. 2 is a diagrammatic side elevation view of the FIG. 1 saw blade balanced by the addition of a weight to one side of the blade.

In order to have the disk balanced in the horizontal level position, as in FIG. 2, a third force must be added so that $F_2 l_2 = F_1 l_1 + F_3 l_3$. $F_3$ can be provided by adding a weight 3 to the disk. The longer that the distance $l_3$ is, the smaller weight 3 may be. For a given weight 3, $l_3$ may be adjusted until horizontal equilibrium is achieved. When the disk is horizontal, the distances of $F_1$ and $F_2$ away from the hub will not be exactly $l_1$ and $l_2$, so the distances, when the disk is horizontal, are represented by $l'_1$ and $l'_2$. Correspondingly, the length of $F_3$ is represented by $l'_3$. This is shown in FIG. 2.

Figure 3:
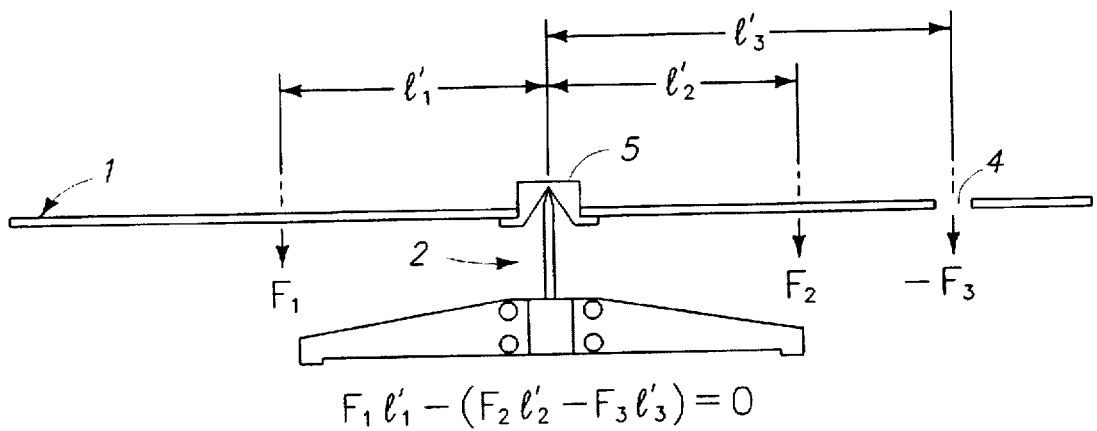
FIG. 3 is a diagrammatic side elevation view of the FIG. 1 saw blade balanced by the removal of a portion of the saw blade.

Rather than adding a weight 3, however, the same result may be achieved by removing a portion of the disk equal to the amount of the weight 3. The resulting aperture 4 must be located on the opposite side of the disk hub at a distance equal to $l'_3$ to achieve balance. This is shown in FIG. 3.

The purpose of the tool of this invention is to enable the user to locate the point at which a portion of the disk may be removed, and the amount of the disk to be removed, to balance the saw blade, without the need to measure or calculate. The tool of this invention comprises a saw blade balancing stand 2, illustrated in FIGS. 1-3 and 19; a saw blade hub centering cap 5, illustrated in FIGS. 1-3 and 21; and a saw blade balancing gauge 6, illustrated in FIGS. 13 and 29 as applied to a saw blade 1. The saw blade balancing gauge 6 has a balancing mechanism which may be operated by a user of the tool to ascertain the amount of a weight 3 required to balance the blade 1 and the location of the center point at which a corresponding aperture 4 may be located. A drill size chart, such as the chart shown in FIG. 31, may then be employed to determine the size of the aperture 4 needed to remove a portion of the blade 1 in an amount equal to the amount of the weight 3. The saw balancing tool of this invention could be provided in a kit comprising a set of weights 3, such as the weight set shown in FIG. 30, two or more balancing caps 5, such as shown in FIGS. 22A and 22B, along with a balancing stand 2 and a balancing gauge 6.

Figure 13:
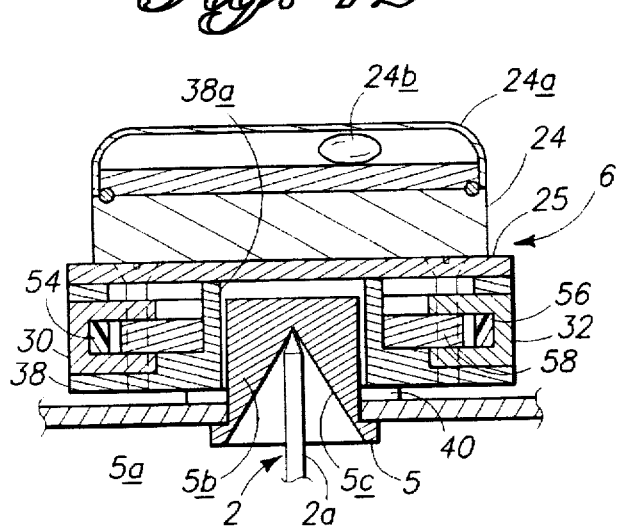
FIG. 13 is a partial vertical cross-section through the center of the FIG. 4 blade balancing gauge applied to a saw blade and supported by a centering cap and a balancing stand.

With respect to FIGS. 1-3, 13, 19 and 21, the centering cap 5 is inserted through the saw blade arbor aperture and then placed on the balancing stud 2a of the balancing stand. The balancing gauge 6 is then set over the centering cap 5. The centering cap 5 has an annular shoulder 5a which supports the saw blade 1, and a raised cylinder 5b that protrudes through the saw blade arbor aperture. The interior 5c of the centering cap 5 is conical, ending with an apex that is elevated above the saw blade 1 as seen in FIG. 13. The upper end of the balancing stud 2a is pointed and supports the centering cap 5 by engaging the centering cap's conical interior at its apex, also as seen in FIG. 13. The interior apex is elevated above the saw blade 1 so that any unbalanced condition will be manifested by rotation of the saw blade, as explained with reference to FIGS. 1-2 above. As shown in FIG. 13, and as will be explained in detail hereinafter, the balancing gauge 6 fits over the centering cap's raised cylinder 5b and is centered on the saw blade 1. The balancing gauge 6 is then adjusted to bring the saw blade to a horizontal position, thereby indicating where and in what amount a portion of the saw blade must be removed to balance the saw blade. At that point, a hole of appropriate size is drilled through the saw blade to achieve the desired balance.

The balancing gauge 6, and its various parts, is illustrated in FIGS. 4-17, and is specifically enumerated in FIG. 13. The balancing gauge 6 comprises a frame 20, a balancing mechanism 22 carried by the frame 20, and a level indicator 24 carried by the frame 20. The gauge 6 is balanced longitudinally and transversely, and the level indicator 24 is so located that it will indicate an out-of-balance condition of the saw blade 1 and will indicate when the balancing mechanism has been adjusted to balance the saw blade. The frame 20 is elongated and preferably balanced about its longitudinal and transverse center lines. Likewise, the balancing mechanism 22 and the level indicator 24 are preferably balanced about the longitudinal and transverse center lines of frame 20. Therefore, when the balancing gauge 6 is applied to a saw blade, by being positioned over the centering cap, its weight will be centered over the balancing stand's balancing stud 2a. The level indicator 24 is preferably longitudinally and transversely centered on the frame 20.

The balancing gauge frame 20 comprises a pair of parallel side rails 30,32 that are connected by end caps 34, 36, and a longitudinally and transversely centered centering cap retainer 38 that is mounted between the side rails. As seen in FIGS. 5 and 13, the retainer 38 is provided with a cylindrical cavity 38a having a diameter just slightly larger than the outer diameter of the centering cap 5. When the gauge 20 is applied to the centering cap 5, it will be balanced axially over the balancing stud 5a. The side rails 30,32 are fabricated as rectangular channels and are oriented so that their respective channels face one another as seen in the cross sections of FIGS. 6-13. The end caps 34, 36 are fabricated with sides configured to fit within the side rail channels and to overlay the upper legs of the side rail channels as seen in FIGS. 6, 14 and 15, with respect to end cap 34 and its sides 34a, 34b. The rails 30, 32 are fastened to the end caps 34, 36 with screws 35, 37 as seen in FIG. 5.

A circular disk support pad 40 is attached to the bottom side of each end cap to elevate the frame 20 and the parts connected thereto above the saw blade surface, as seen particularly in FIG. 13. The support pads 40 position the frame 20 on the saw blade such that the retainer 38 straddles the centering cap cylinder 5b with a clearance between the top of the cap cylinder 5b and the top of the retainer cavity 38a. Preferably, the support pads 40 are fabricated from a low friction material such as a plastics material. Consequently, the frame 20 may be easily rotated about cap cylinder 5b.

The retainer 38 is a rectangular member that is notched to fit under and over the side rails 30, 32, as well as to extend into the opposing side rail channels as seen particularly in FIG. 8. The retainer is fastened to the side rails 30, 32 by screws 39. The retainer, in addition to serving to mount the balancing gauge 6 on the centering cap 5, by way of its centering cavity 38a, mounts the level indicator 24.

Level indicator 24 comprises a circular disk bubble level having a transparent circular viewing dome 24a which confines the float liquid within which the level bubble 24b is confined. The dome 24a contains a centered level ring 24c that is longitudinally and transversely centered with respect to frame 20. The circular disk bubble level is mounted on a rectangular plate 25. Mounting plate 25 overlays the retainer 38 and is fastened thereto by screws 39, as seen in FIG. 8.

Figure 11:
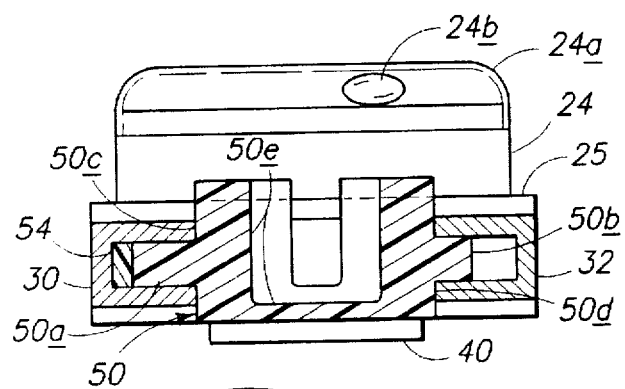
FIG. 11 is a cross-section taken along the line 11—11 in FIG. 4.

The balancing mechanism 22 comprises a pair of sliders 50, 52 that are coupled together by a rack and pinion arrangement so that they will move in unison toward and away from one another. The sliders 50, 52 are rectangular and provided with side ribs 50a, 50b and 52a, 52b that extend into the channels of the side rails, as seen in FIGS. 7 and 11. The slider ribs protrude from side walls 50c, 50d, 52c, 52d that bear against the inner edges of the side rails, also as seen in FIGS. 7 and 11. The ribs and side walls of the sliders keep the sliders stable within, and aligned to, the side rails so that the sliders can be moved along the rails without binding. The sliders are preferably fabricated from plastics material. The sliders have equal peripheral dimensions and are of equal mass. One slider 50 is provided with a seat 50e for a weight 3 and the other slider 52 is provided with a marking hole 52e.

Figure 12:
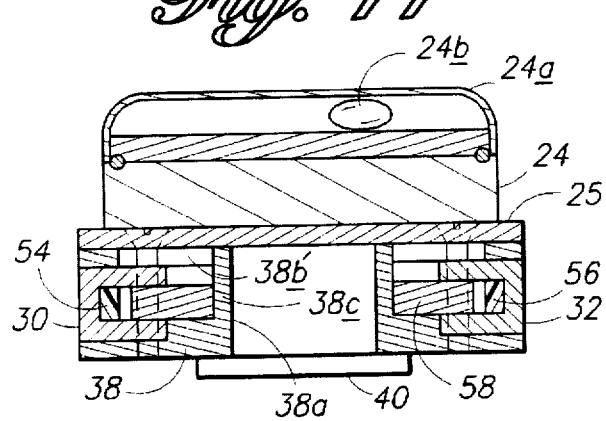
FIG. 12 is a cross-section taken along the line 12—12 in FIG. 10.
Figure 18:
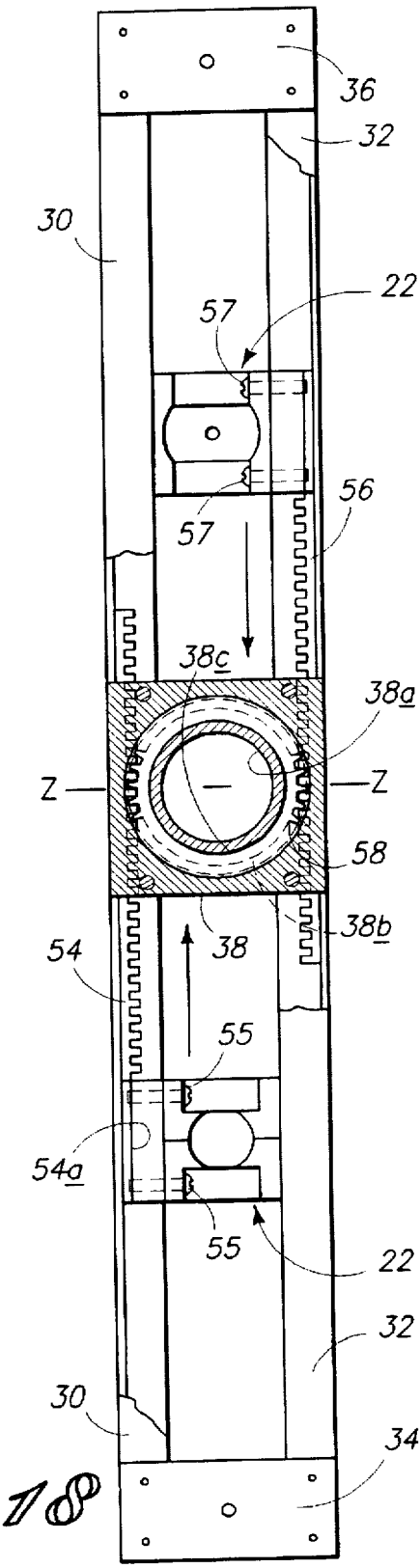
FIG. 18 is a top plan view of the FIG. 1 gauge with portions broken away to illustrate the relationships among parts of the gauge.

The rack and pinion arrangement for the balancing mechanism 22 comprises a pair of straight toothed bars 54, 56. Bar 54 is fastened to slider 50 by screws 55 and bar 56 is fastened to slider 52 by screws 57 as seen in FIGS. 9 and 18. One end of each bar, 54, 56, is provided with a slider mounting surface, as at 54a in FIG. 17, adjacent to the toothed section of the bar. As seen in FIGS. 7–13 and 18, the bars 54, 56 are disposed along the base of the side rail channels with their teeth facing toward the opposite bar. The teeth of bars 54, 56 are engaged with the teeth of a ring gear 58, as seen in FIGS. 12, 13, 16 and 18 so that movement of one slider 50, 52 will effect an equal and opposite movement of the other slider, as seen in FIG. 10. Ring gear 58 is mounted by retainer 38 within an annular channel 38b as seen in FIG. 18. The retainer 38 is configured so that annular channel 38b opens at each side into the adjacent side rail channel so that the ring gear teeth are exposed to, and meshed with, the teeth of the toothed bars 54,56. The configuration of the annular channel 38b opening into the side rail channels, with the teeth of bars 54, 56 engaged with the teeth of the ring gear 58 is shown in FIGS. 12 and 18. A cylindrical wall 38c divides the ring gear channel 38b from the retainer cavity 38a as also seen in FIGS. 12 and 18. The inner diameter of the ring gear 58 is slightly larger than the outer diameter of the dividing wall 38c so that the ring gear is free to rotate within the channel 38b. The ring gear 58 and toothed bars 54, 56 are preferably fabricated from plastics material.

Figure 34:
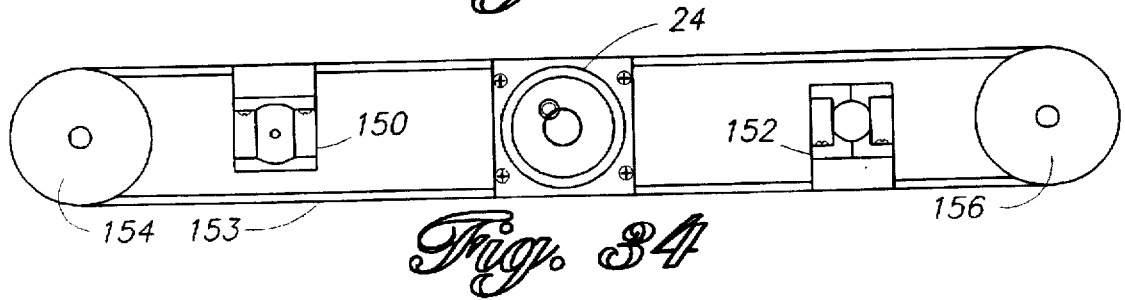
FIG. 34 is an illustration of an alternate balancing mechanism for a blade balancing gauge.

The rack and pinion arrangement of the balancing mechanism 22 couples the sliders 50, 52 together so that the sliders' longitudinal displacement is synchronized. FIG. 34 illustrates another arrangement for coupling the sliders 150, 152 together so that their longitudinal displacement is synchronized. The sliders 150, 152 are coupled for synchronized movement by means of an endless cable 153 and two pulleys 154, 156. The pulleys 154, 156 would be mounted in an appropriate framework structure, similar to rails 30, 32 of the FIGS. 4–5 embodiment, so that the pulleys and the cable 153 would be supported between the top and bottom of the balancing gauge. Appropriate framework ends would also be provided to include disk support pads, similar to pads 40 of the FIGS. 4–5 embodiment. An appropriate center support to carry the level indicator 24 would also be provided, similar to retainer 38 of the FIGS. 4–5 embodiment. The sliders 150, 152 may be substantially the same as sliders 50, 52 of the FIGS. 4–5 embodiment, except that appropriate fasteners would be included so that the sliders 150, 152 would be attached to the cable 153. In other respects, sliders 150, 152 would be the same as sliders 50, 52. Framework ends, such as ends 34, 36 of the FIGS. 4–5 embodiment, could be provided with structure that would accommodate the pulleys 154, 156 so that the cable 153 could be reeved around the pulleys and extended through the longitudinal channels of rails, where the rails would be similar to rails 30, 32 of the FIGS. 4–5 embodiment. A cable having a discrete length can be formed into an endless cable by being joined at its ends or by having its ends both secured to one of the sliders 150, 152.

The balancing stand 2, as seen in FIGS. 19, 20, 23–27, comprises three legs 60, 62, 64 attached in a tripod arrangement to a central stud mounting member 66. Each of the legs is fastened to the mounting member 66 by screws 67. The mounting member 66 may be fabricated from a cylinder by providing flats 66a for the legs 60,62,64 that are bored and threaded at 66b to receive the fastening screws 67. The balancing stud 2a is secured to the mounting member 66 and extends vertically from the top of the mounting member, preferably axially as seen in FIG. 20. The legs 60,62,64 mount the mounting member 66 so that it is elevated, and each leg is provided with support feet, 60a, 62a, 64a at each extremity so that the balancing stand will be stable, even when placed on an uneven surface. The upper end of the balancing stud 2a is pointed so that its support of the centering cap 5 will be a point support.

The balancing tool of this invention may be used to balance a circular saw blade in the following manner. A circular saw blade 1 is fitted with a centering cap 5 so that the blade is carried by the centering cap shoulder 5a as seen in FIG. 13. The blade and centering cap are then placed on the balancing stand 2 by setting the balancing cap over the pointed end of the balancing stud 2a so that the blade/centering cap combination is supported by a point support as also seen in FIG. 13. As a consequence of the apex of the centering cap's interior 5c being above the plane of the blade 1, the blade will assume an attitude to bring the couples acting on it into equilibrium, as explained above with respect to FIGS. 1–3. If the blade is out of balance, it will rotate (i.e. tilt) about the point support provided by balancing stud 2a until that equilibrium condition is reached.

Figure 29:
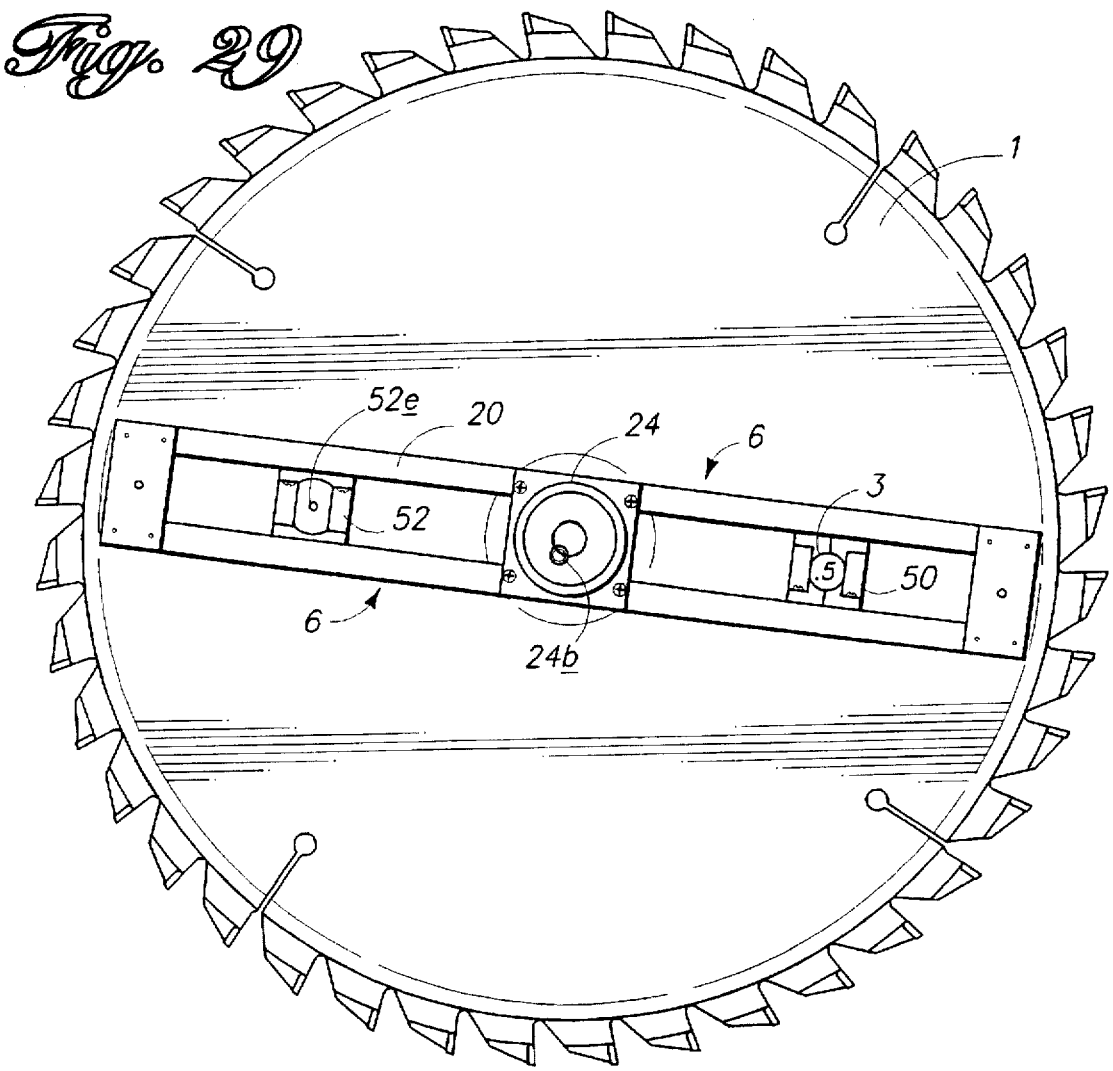
FIG. 29 is a top plan view of the FIG. 28 saw blade fitted with the FIG. 4 balancing gauge.
Figure 30:
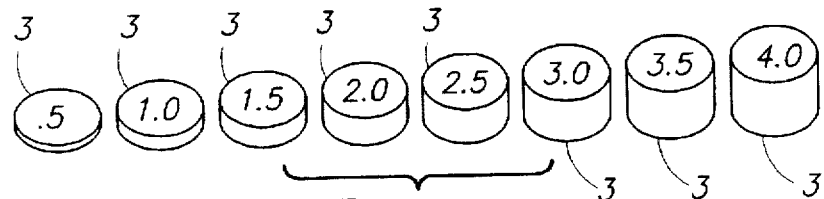
FIG. 30 depicts eight weights used with the FIG. 4 balancing gauge.

The balancing gauge 6 is placed on the saw blade 1, over the centering cap 5, as seen in FIGS. 13 and 29. The gauge 6 may be rotated around the centering cap's raised cylinder 5b until the level bubble 24b is generally disposed on the longitudinal center line of the gauge. A weight 3, such as the 0.5 gram weight shown in FIG. 30 is placed in the seat 50e of the slider 50. Then, one or the other of the sliders 50, 52 is moved in the frame 20, inward or outward, to attempt to locate the weight 3 at a point where the blade 1 will assume a horizontal position. If the blade can be thus brought to a horizontal position, that will indicate that the blade is brought into balance with the 0.5 gram weight 3 located at that particular point. If the blade cannot be brought into balance with the 0.5 gram weight, a 1.0 gram weight from the FIG. 30 set may be substituted for the 0.5 gram weight, and the balancing mechanism's sliders 50,52 repositioned to attempt to achieve balance. This procedure is repeated until one of the weights from the FIG. 30 set results in the blade 1 attaining a horizontal position. Assuming that the blade 1 can be brought to a horizontal position with a 0.5 gram weight located on the saw blade at the location shown in FIG. 29, a marking implement may then be used to mark the blade through the marking hole 52e in the slider 52. That marked spot on the blade 1 indicates where material may be removed in an amount equal to the weight 3 (i.e. 0.5 grams in this example) to balance the saw blade. The blade may then be removed from the balancing tool of this invention.

A drill size chart, such as that shown in FIG. 31 may then be used to determine the hole size that must be drilled out of the blade 1 to effect a removal of the amount corresponding to the amount of the weight 3 (i.e., 0.5 grams in this example). Assuming that the saw blade 1 has a thickness of 0.08 inches, the chart of FIG. 31 indicates that a ¼ inch drill may be used to drill out the appropriate amount from the blade. FIG. 32 illustrates the procedure with respect to a 2 gram weight for a saw blade thickness of 0.062 inches, a 9/16 inch drill being required to attain blade balance.

If the user would prefer to not drill out a 2 gram hole, the chart of FIG. 32 could be employed to select a one gram drill size of the 0.062 blade thickness; that being a 13/32 inch drill. Then the technique shown in FIG. 33 could be employed to determine where two one gram holes may be drilled that would correspond to the two gram hole of FIG. 32. In the case of FIG. 33, an arc is scribed through the spotted point from use of the marking hole 52e of the slider 52, and two new points are marked that are equidistant from the spotted point. This is one example of a number of drilling alternatives. For example, if the weight was 2.5 grams, it could be divided in to two one gram holes and a ½ gram hole. The ½ gram hole could be placed on the spotted point and two one gram holes located as shown in FIG. 33; or five ½ gram holes could be located on the scribed arc as long as they are symmetrical about the radial line R through the spotted point; and so forth.

The balancing gauge 6 is convenient to use to establish where a hole may be drilled in the blade 1 to balance the blade. The sliders 50, 52 are easily moved inward and outward since the frame 20 is supported at its ends by the support pads 40 so that the sliders clear the blade's surface. Weights 3 from the set of weights of FIG. 30 are easily placed in the weight seat 50e of the slider 50. The level indicator 24, with its level ring 24c and bubble 24b conveniently indicates when the frame 20 is oriented in the appropriate line, and also conveniently indicates when the sliders have been located in the correct spot for balancing the blade with a particular amount for the weight 3. In the use of the balancing tool of this invention, a convenient set of weights 3 that will accommodate must out of balance conditions is shown in FIG. 30: 0.5, 1.0, 1.5, 2.0, 2.5, 3.0, 3.5, and 4.0 gram disks.

When the saw blade 1 is supported slightly above its center of gravity, an out of balance condition will cause a couple to rotate the disk until equilibrium is established. The support of the blade, through the balancing stud 2a at its point contact with the apex of the conical interior 5c of the balancing cap 5 achieves the desired result of supporting the saw blade above its center of gravity because the apex of the conical interior 5c is located above the saw blade by a small distance. The shorter this distance, the more sensitive the balance becomes. If the user feels that the system is becoming too sensitive, a balancing cap 5 with a deeper conical interior 5c may be substituted. Thus, as seen in FIGS. 22A and 22B, the balancing tool of this invention may be provided with two balancing caps 5, the FIG. 22A cap having a shallower conical interior 5c so that its apex is closer to the saw-mounting shoulder 5a than is the case with the FIG. 22B cap's interior 5c' with respect to its shoulder 5a'. The FIG. 22B cap with the shallowest cone would be used for the thinnest saw blades. For thicker saw blades, the user may feel that the system is becoming too sensitive and desire to shift to the FIG. 22A cap with the deeper cone.

While the preferred embodiment of the invention has been described herein, variations in the design may be made. The less that the balancing gauge weighs, the easier it is to balance and the less effect it has when mounted on a saw blade, and, therefore, the various parts of the balancing gauge may be fabricated from metallic or non-metallic materials accordingly, with due consideration being given to the sensitivity desired and the cost of materials required to achieve a given sensitivity. The scope of the invention, therefore, is only to be limited by the claims appended hereto.

The embodiments of the invention in which an exclusive property is claimed are defined as follows:

In the claims:

1. A saw blade balancing tool which comprises a balancing gauge adapted to be mounted to a saw blade hub, said balancing gauge comprising a frame, a balancing mechanism mounted to the frame, and a level indicator mounted to the frame; said balancing mechanism including adjustable means for balancing a saw blade and for indicating a locus for removing material from the saw blade to balance the saw blade about its hub.

2. The tool of claim 1 wherein said adjustable means comprises a pair of sliders carried by said frame and means for moving said sliders in synchronism with one another; one of said sliders being adapted to receive a balancing weight and the other of said sliders being adapted to indicate the locus for removing material from the saw blade.

3. The tool of claim 2 wherein said means for moving said sliders comprises a rack and pinion mechanism having two straight toothed bars and a pinion gear, each of said bars being fastened to one of said sliders and meshed with said gear whereby movement of one slider will effect a synchronized movement of the other slider.

4. The tool of claim 2 wherein said means for moving said sliders comprises a pair of pulleys and an endless cable, said cable being reeved around said pulleys and fastened to both sliders whereby movement of one slider will effect a synchronized movement of the other slider.

5. A saw blade balancing tool which comprises a balancing gauge adapted to be mounted to a saw blade hub, and a balancing stand; said balancing gauge comprising a frame, a balancing mechanism mounted to the frame, and a level indicator mounted to the frame; said balancing mechanism including adjustable means for balancing a saw blade and for indicating a locus for removing material from the saw blade to balance the saw blade about its hub; and said balancing stand having means for mounting a saw blade at its hub and for positioning said balancing gauge on the saw blade.

6. The tool of claim 5 wherein said adjustable means comprises a pair of sliders carried by said frame and means for moving said sliders in synchronism with one another; one of said sliders being adapted to receive a balancing weight and the other of said sliders being adapted to indicate the locus for removing material from the saw blade.

7. The tool of claim 6 wherein said means for moving said sliders comprises a rack and pinion mechanism having two straight toothed bars and a pinion gear, each of said bars being fastened to one of said sliders and meshed with said gear whereby movement of one slider will effect a synchronized movement of the other slider.

8. The tool of claim 6 wherein said means for moving said sliders comprises a pair of pulleys and an endless cable, said cable being reeved around said pulleys and fastened to both sliders whereby movement of one slider will effect a synchronized movement of the other slider.

9. A saw blade balancing tool which comprises a balancing gauge adapted to be mounted to a saw blade hub, said balancing gauge comprising a frame, a balancing mechanism mounted to the frame, and a level indicator mounted to the frame; said balancing mechanism including adjustable means for balancing a saw blade and for indicating a locus for removing material from the saw blade to balance the saw blade about its hub; and said frame comprising a pair of side members having inwardly facing channels, a pair of end members joining said side members, and a centrally-disposed retainer member extending between said side members and mounting said level indicator.

10. The tool of claim 9 wherein said adjustable means comprises a pair of sliders carried by said frame and means for moving said sliders in synchronism with one another; one of said sliders being adapted to receive a balancing weight and the other of said sliders being adapted to indicate the locus for removing material from the saw blade.

11. The tool of claim 10 wherein said means for moving said sliders comprises a rack and pinion mechanism having two straight toothed bars and a pinion gear, each of said bars being fastened to one of said sliders and meshed with said gear whereby movement of one slider will effect a synchronized movement of the other slider; one of said sliders being carried in the channel of one of said side members and the other of said sliders being carried in the channel of the other of said side members, and said pinion gear being carried by said retainer member.

12. The tool of claim 10 wherein said means for moving said sliders comprises a pair of pulleys and an endless cable, said cable being reeved around said pulleys and fastened to both sliders whereby movement of one slider will effect a synchronized movement of the other slider; each of said pulleys being carried by said frame and said endless cable being extending through the channels of said side members.

13. A saw blade balancing tool which comprises balancing gauge means adapted to be mounted to a saw blade hub, and balancing stand means; said balancing gauge means comprising a frame, balancing mechanism means mounted to the frame, and level indicator means mounted to the frame; said balancing mechanism means including adjustable means for balancing a saw blade and for indicating a locus for removing material from the saw blade to balance the saw blade about its hub; said adjustable means including a pair of sliders carried by said frame and means for moving said sliders in synchronism with one another; one of said sliders being adapted to receive a balancing weight and the other of said sliders being adapted to indicate the locus for removing material from the saw blade; said balancing stand means having means for mounting a saw blade at its hub and for positioning said balancing gauge means on the saw blade; and said frame comprising a pair of side members having inwardly facing channels, a pair of end members joining said side members, and a centrally-disposed retainer member extending between said side members and mounting said level indicator means.

14. The tool of claim 13 wherein said means for moving said sliders comprises a rack and pinion mechanism having two straight toothed bars and a pinion gear, each of said bars being fastened to one of said sliders and meshed with said gear whereby movement of one slider will effect a synchronized movement of the other slider; one of said sliders being carried in the channel of one of said side members and the other of said sliders being carried in the channel of the other of said side members, and said pinion gear being carried by said retainer member.

15. The tool of claim 13 wherein said means for moving said sliders comprises a pair of pulleys and an endless cable, said cable being reeved around said pulleys and fastened to both sliders whereby movement of one slider will effect a synchronized movement of the other slider; each of said pulleys being carried by said frame and said endless cable being extending through the channels of said side members.

* * * * *